(12) United States Patent
Tsuruoka et al.

(10) Patent No.: US 11,788,331 B2
(45) Date of Patent: Oct. 17, 2023

(54) HINGE DEVICE

(71) Applicant: SUGATSUNE KOGYO CO., LTD., Tokyo (JP)

(72) Inventors: Kei Tsuruoka, Tokyo (JP); Yoshitaka Ishii, Tokyo (JP); Yuichi Hatano, Tokyo (JP)

( * ) Notice: Subject to any disclaimer, the term of this patent is extended or adjusted under 35 U.S.C. 154(b) by 99 days.

(21) Appl. No.: 17/597,329

(22) PCT Filed: Jun. 29, 2020

(86) PCT No.: PCT/JP2020/025520
§ 371 (c)(1),
(2) Date: Jan. 3, 2022

(87) PCT Pub. No.: WO2021/006096
PCT Pub. Date: Jan. 14, 2021

(65) Prior Publication Data
US 2022/0316248 A1    Oct. 6, 2022

(30) Foreign Application Priority Data

Jul. 11, 2019    (JP) .................. 2019-129404

(51) Int. Cl.
*E05D 11/06* (2006.01)
*E05D 3/18* (2006.01)
*E05D 11/08* (2006.01)

(52) U.S. Cl.
CPC ................ *E05D 3/18* (2013.01); *E05D 11/08* (2013.01); *E05D 2700/10* (2013.01)

(58) Field of Classification Search
CPC .... E05D 3/06; E05D 3/12; E05D 3/14; E05D 3/142; E05D 3/16; E05D 3/125;
(Continued)

(56) References Cited

U.S. PATENT DOCUMENTS 2,320,772 A * 6/1943 Doman .................. E05D 3/18
16/358
2,608,713 A    9/1952 Soss
(Continued)

FOREIGN PATENT DOCUMENTS

CN    206647416 U * 11/2017
EP    1577474 A2    9/2005
(Continued)

OTHER PUBLICATIONS

WIPO, Japanese International Search Authority, International Search Report (with English translation) dated Aug. 25, 2020 in International Patent Application No. PCT/JP2020/025520, 5 pages.
(Continued)

*Primary Examiner* — Chuck Y Mah
(74) *Attorney, Agent, or Firm* — Masuvalley & Partners; Peter Martinez

(57) ABSTRACT

One end of first and second arms 30 and 40 are rotatably connected to a first hinge body 10 and a second hinge body 20, respectively. The other end of the first arm is guided by a second guide 25 of the second hinge body and the other end of the second arm is guided by a first guide 15 of the first hinge body. Friction torque is applied on the second hinge body by the friction plate 60. The first guide has a main guide portion 15*x* and a sub-guide portion 15*y* that is connected to an end of the main guide portion and draws an arc centered on the first shaft member. When the other end of the second arm is on the sub-guide portion, frictional resistance is not received, so that the second hinge body is automatically rotated by the urging member 70.

10 Claims, 16 Drawing Sheets

(58) Field of Classification Search
CPC ........... E05D 3/127; E05D 3/18; E05D 3/185;
E05D 3/186; E05D 7/04; E05D 7/0423;
E05D 7/0415; E05D 7/043; E05D 7/0027;
E05D 7/0045; E05D 5/02; E05D 5/062;
E05D 11/08; E05D 11/00; E05D 11/06;
E05D 11/1014; E05D 11/1007; E05D
2007/0438; E05D 2007/0446; E05D
2007/0453; E05D 2007/0461; E05D
2007/0469; E05D 2007/0476; E05D
2007/0484; E05D 2007/0492; E05D
2007/10; E05Y 2600/41; E05Y 2600/634;
E05Y 2600/412; E05Y 2600/45; E05Y
2600/452; E05Y 2600/46; E05Y
2900/132; E05Y 2900/20; E05Y 2900/50;
E05Y 2900/531; E05Y 2900/546; E05Y
2900/606; E05Y 2201/638; E05Y
2201/712
See application file for complete search history.

(56) References Cited

U.S. PATENT DOCUMENTS

| | | | | |
|---|---|---|---|---|
| 3,860,995 | A * | 1/1975 | Lautenschlager, Jr. ... | E05D 3/16 16/332 |
| 4,083,082 | A * | 4/1978 | Holmes ................... | E05D 3/142 16/303 |
| 4,827,569 | A * | 5/1989 | Mertes ..................... | E05D 3/18 16/302 |
| 4,843,680 | A * | 7/1989 | Cress ...................... | E05D 3/186 16/370 |
| 5,530,993 | A | 7/1996 | Hayakawa | |
| 8,650,713 | B2 * | 2/2014 | Migliorini ........... | E05D 11/1021 16/370 |
| 9,725,939 | B2 * | 8/2017 | Adair .................. | E05D 11/0081 |
| 10,100,970 | B1 | 10/2018 | Wu et al. | |
| 10,152,095 | B2 * | 12/2018 | Lin ...................... | H05K 5/0226 |
| 2008/0289146 | A1 * | 11/2008 | Chen ....................... | E05D 3/186 16/372 |
| 2012/0117757 | A1 * | 5/2012 | Oshima ................. | E05D 7/0423 16/236 |
| 2012/0180396 | A1 * | 7/2012 | Liermann ............... | E05D 3/186 16/369 |
| 2015/0031224 | A1 * | 1/2015 | Dreisewerd ........... | H01R 35/04 439/165 |

FOREIGN PATENT DOCUMENTS

| | | | | |
|---|---|---|---|---|
| EP | 1754848 | A2 * | 2/2007 | ............ E05D 3/186 |
| EP | 1754848 | A2 | 2/2007 | |
| EP | 1754848 | A3 | 1/2009 | |
| EP | 1577474 | A3 | 7/2010 | |
| EP | 2581533 | A1 * | 4/2013 | ............ E05D 3/18 |
| EP | 2781676 | A1 | 9/2014 | |
| EP | 3176353 | A1 * | 6/2017 | |
| GB | 1052733 | A | 12/1966 | |
| JP | H056040 | A | 1/1993 | |
| JP | H0552181 | U | 7/1993 | |
| JP | 2561477 | Y2 | 1/1998 | |
| JP | 2007211577 | A | 8/2007 | |
| JP | 2009257034 | A * | 11/2009 | |
| JP | 2015194242 | A | 11/2015 | |
| JP | 6092171 | B2 | 3/2017 | |
| JP | 2018109300 | A * | 7/2018 | |
| WO | WO-2010143405 | A1 * | 12/2010 | ............ E05D 3/12 |

OTHER PUBLICATIONS

WIPO, Japanese International Search Authority, International Written Opinion dated Aug. 25, 2020 in International Patent Application No. PCT/JP2020/025520, 6 pages.
CNIPA/CN, Chinese Office Action dated Feb. 18, 2023 in Chinese Patent Application No. 202080049589.8, 7 pages.
Extended European Search Report/EPO, Extended European Search Report dated Jun. 14, 2023 in European Patent Application No. 20836835.7, 8 pages with translation.

* cited by examiner

HINGE DEVICE

RELATED APPLICATIONS

This application is the U.S. National Phase of and claims priority to International Patent Application No. PCT/JP2020/025520, International Filing Date Jun. 29, 2020; which claims benefit of Japanese Patent Application No. 2019-129404 filed Jul. 11, 2019; both of which are incorporated herein by reference in their entireties.

TECHNICAL FIELD

The present invention relates to a hinge device in which first and second hinge bodies are connected by first and second arms.

BACKGROUND

As shown in Patent Document 1 (Japanese Patent No. 6092171), a hinge device including first and second hinge bodies and first and second arms having a bent shape and connecting the first and second hinge bodies is publicly known. In the above hinge device, one end of the first arm is rotatably connected to the first hinge body via a first shaft member, one end of the second arm is rotatably connected to the second hinge body via a second shaft member, and bent parts in the middle of the first and second arms are rotatably connected to each other via an intermediate shaft member. Further, the other end of the second arm is slidably and rotatably guided along a first guide formed on the first hinge body and the other end of the first arm is slidably and rotatably guided along a second guide formed on the second hinge body. With the above configuration, the second hinge body rotates relative to the first hinge body in a predetermined rotational locus.

In the hinge device of Patent Document 1, a friction plate is interposed between the first arm and the second arm and this friction plate causes friction resistance against a relative rotation of the first arm and the second arm, and eventually, friction torque against a relative rotation of the second hinge body with respect to the first hinge body is generated. According to this configuration, for example, when the first hinge body is fixed to a case body and the second hinge body is fixed to a lid, the lid can be stably maintained at an arbitrary angle position.

On the other hand, Patent Document 2 (Utility Model Registration No. 2561477) discloses a hinge device having a same basic structure as Patent Document 1 and used for a folding door device. In the hinge device of Patent Document 2, coil springs are provided on first and second hinge bodies fixed to adjacent doors, respectively. When the adjacent door approaches a flush closing position, the coil spring pushes ends of the first and second arms through a pressing member, so that rotation torque in the direction of closing the door is applied to the first and second hinge bodies. As a result, the adjacent doors can be reliably closed flush with each other and this flush state can be stably maintained.

SUMMARY OF THE INVENTION

Problem to be Solved by the Invention

A hinge device that exhibits both a holding function at an arbitrary angle position disclosed in Patent Document 1 and a rotation torque applying function by a coil spring disclosed in Patent Document 2 (in other words, a catching function that holds a rotation object at a rotation limit angle) has not been developed.

Means for Solving the Problem

The present invention has been made to solve the above problems and the present invention is a hinge device including first and second hinge bodies, first and second arms arranged between the first and second hinge bodies, a first shaft member that rotatably connects one end of the first arm to the first hinge body, a second shaft member that rotatably connects one end of the second arm to the second hinge body and an intermediate shaft member that rotatably connects intermediate portions of the first and second arms.

A first guide having a main guide portion extending in a direction approaching or separating from the first shaft member is formed on the first hinge body and the other end of the second arm is slidably and rotatably guided to the first guide, a second guide extending in a direction approaching or separating from the second shaft member is formed on the second hinge body and the other end of the first arm is slidably and rotatably guided to the second guide, and the hinge device further includes a friction resistance generation mechanism that provides frictional resistance against a relative rotation of the first and second arms around the intermediate shaft member and eventually provides friction torque against a relative rotation of the second hinge body with respect to the first hinge body.

The first hinge body is provided with an energizing member that applies rotation torque toward a rotation limit position to the second hinge body by energizing the first arm, the first guide further has a sub-guide portion connected to one end of the main guide portion, and in the process in which the second hinge body rotates relative to the first hinge body over a specific angle range from the rotation limit position, the other end of the second arm moves along the sub-guide portion and the sub-guide portion is formed so as to allow the other end of the second arm to move along an arc centered on the first shaft member.

According to the above configuration, the hinge device can have both a function of holding the second hinge body by the friction resistance generation mechanism at an arbitrary angle position with respect to the first hinge body and a function of applying the rotation torque to the second hinge body by the energizing member toward the rotation limit position.

It is preferred that the first hinge body has first guide grooves as the first guide, the first guide groove has a main groove portion as a main guide portion and a sub-groove portion as the sub-guide portion, the second hinge body has second guide grooves as the second guide, a first protrusion having a circular cross section inserted into the second guide grooves is formed at the other end of the first arm and a second protrusion having a circular cross section inserted into the first guide grooves is formed at the other end of the second arm.

It is preferred that the first hinge body and the second hinge body each have a base wall and a pair of side walls that are orthogonal to the base wall and parallel to each other, the first guide grooves having the same shape are formed on each of the pair of side walls of the first hinge body, the second guide grooves having the same shape are formed on each of the pair of side walls of the second hinge body, each of both ends of a first slide pin which passes through and is supported by the other end of the first arm is provided as the first protrusion and each of both ends of a second slide pin which passes through and is supported by the other end of the second arm is provided as the second protrusion.

It is preferred that the sub-groove portion of the first guide groove has an inner edge close to the first shaft member and an outer edge away from the first shaft member and in the process of the second hinge body moving toward the rotation limit position in the specific angle range, the second protrusion moves along the sub-groove portion without making contact with either the inner edge or the outer edge of the sub-groove portion.

According to the above configuration, the friction resistance due to a contact between the second protrusion and the sub-groove portion can be made zero, and even if the force of the energizing member is relatively weak, the rotation torque toward the rotation limit position can be reliably applied to the second hinge body.

It is further preferred that the inner edge of the sub-groove portion is deviated so as to be closer to the first shaft member than a virtual line that draws the arc centered on the first shaft member from a point inside an intersection of the main groove portion and the sub-groove portion.

According to the above configuration, the frictional resistance due to a contact between the second protrusion and the sub-groove portion can be surely reduced to zero.

In one embodiment, it is preferred that the energizing member consists of a torsion spring, the torsion spring has a locking portion that is locked to the first hinge body and a pressing portion, a receiving surface is formed at the one end of the first arm and when the second hinge body is in a predetermined torque applying angle range, the pressing portion of the torsion spring pushes the receiving surface.

It is further preferred that the first hinge body and the second hinge body each have a base wall and a pair of side walls that are orthogonal to the base wall and parallel to each other, first guide grooves having the same shape as the first guide are formed on each of the pair of side walls of the first hinge body, second guide grooves having the same shape as the second guide are formed on each of the pair of side walls of the second hinge body, a second protrusion protruding from the other end of the second arm is inserted into the first guide grooves, a first protrusion protruding from the other end of the first arm is inserted into the second guide grooves, an elongated hole is formed in the pair of side walls of the first hinge body, both ends of a pressing pin are slidably inserted in the elongated hole along the elongated hole and when the second hinge body is in the torque applying angle range, the pressing portion of the torsion spring pushes the receiving surface of the first arm via the pressing pin.

According to the above configuration, even when the first arm is thin and/or there are a plurality of the first arms, the rotation torque can be applied to the first arm by the torsion spring.

In another embodiment, the energizing member consists of a leaf spring, both ends of the leaf spring are supported by the first hinge body, a middle portion of the leaf spring is provided as a pressing portion protruding toward one end of the first arm, a receiving surface is formed at the one end of the first arm and when the second hinge body is in a predetermined torque applying angle range, the pressing portion of the leaf spring pushes the receiving surface.

According to the above configuration, even when the first arm is thin and/or there are a plurality of first arms, the leaf spring can reliably apply rotation torque to the first arm.

It is further preferred that the first hinge body and the second hinge body each have a base wall and a pair of side walls that are orthogonal to the base wall and parallel to each other, first guide grooves having the same shape as the first guide are formed on each of the pair of side walls of the first hinge body, second guide grooves having the same shape as the second guide are formed on each of the pair of side walls of the second hinge body, a second protrusion protruding from the other end of the second arm is inserted into the first guide grooves, a first protrusion protruding from the other end of the first arm is inserted into the second guide grooves, the leaf spring has both ends curved in an arc shape and the both ends of the leaf spring are hung on two support pins supported by the pair of side walls of the first hinge body.

According to the above configuration, a mounting structure of the leaf spring can be simplified.

In some embodiments, the first guide further has another sub-guide portion that is connected to the other end of the main guide portion and extends in the direction opposite to the sub-guide portion, and in the process in which the second hinge body rotates relative to another rotation limit position on the opposite side of the rotation limit position over another specific angle range, the other end of the second arm moves along the another sub-guide portion, the another sub-guide portion is formed so as to allow the other end of the second arm to move along an arc centered on the first shaft member.

When the second hinge body is located within a predetermined torque applying angle range from the another rotation limit positions with respect to the first hinge body, the energizing member applies the rotation torque toward the another rotation limit position to the second hinge body by energizing the first arm.

According to the above configuration, the second hinge body can be automatically rotated relative to the first hinge body toward the rotation limit position in the vicinity of the two rotation limit positions.

Effect of the Invention

According to the present invention, the hinge device can have both a function of holding the second hinge body at an arbitrary angle position and a function of automatically rotating the second hinge body relative to the first hinge body toward the rotation limit position.

MODE FOR CARRYING OUT THE INVENTION

Figure 1A:
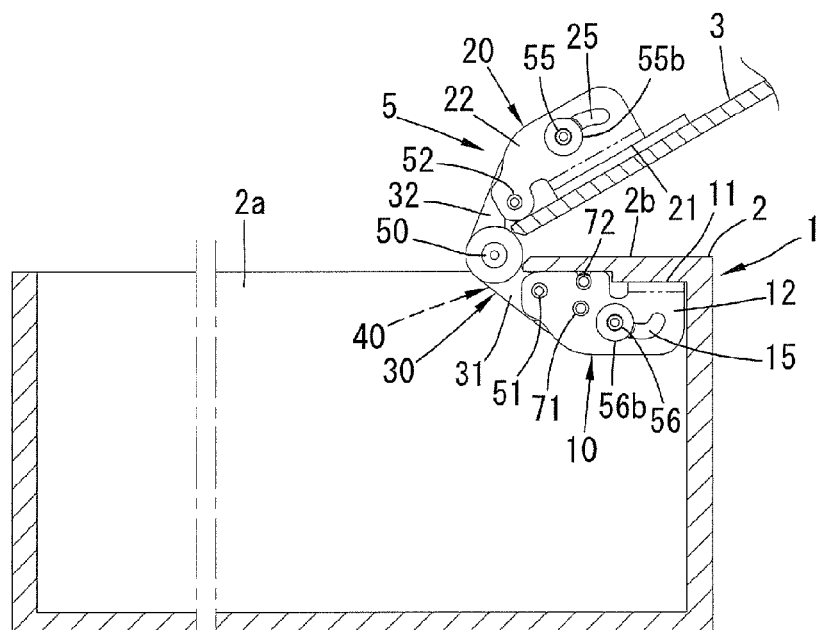
FIG. 1A is a side sectional view of a case provided with a hinge device according to a first embodiment of the present invention and shows a state when a lid is opened at an opening angle of 135° (fully opened position).
Figure 1B:
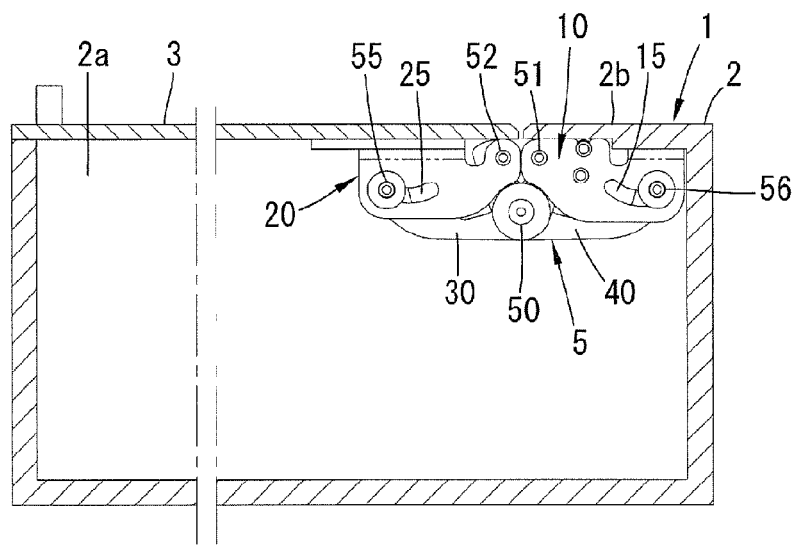
FIG. 1B is a diagram corresponding to FIG. 1A showing a state when the lid is opened at the opening angle of 0° (closed position).

Hereinafter, a first embodiment of the present invention will be described with reference to the drawings. As shown in FIGS. 1A and 1B, a hinge device 5 of this embodiment is mounted on a case 1. The case 1 has a case body 2 (first mounting object; stationary object) and a lid 3 (second mounting object; rotation object) that opens and closes an upper end opening 2a of the case body 2.

At an upper end of the case body 2, a support wall 2b adjacent to the opening 2a and extending in a direction orthogonal to the paper surface is provided. The lid 3 is rotatably connected to the support wall 2b via a plurality of, for example, two hinge devices 5 spaced apart along the support wall 2b. The lid 3 is rotatable between the position of the opening angle of 135° (fully opened position) shown in FIG. 1A and the position of the opening angle of 0° (closed position) shown in FIG. 1B.

Figure 4:
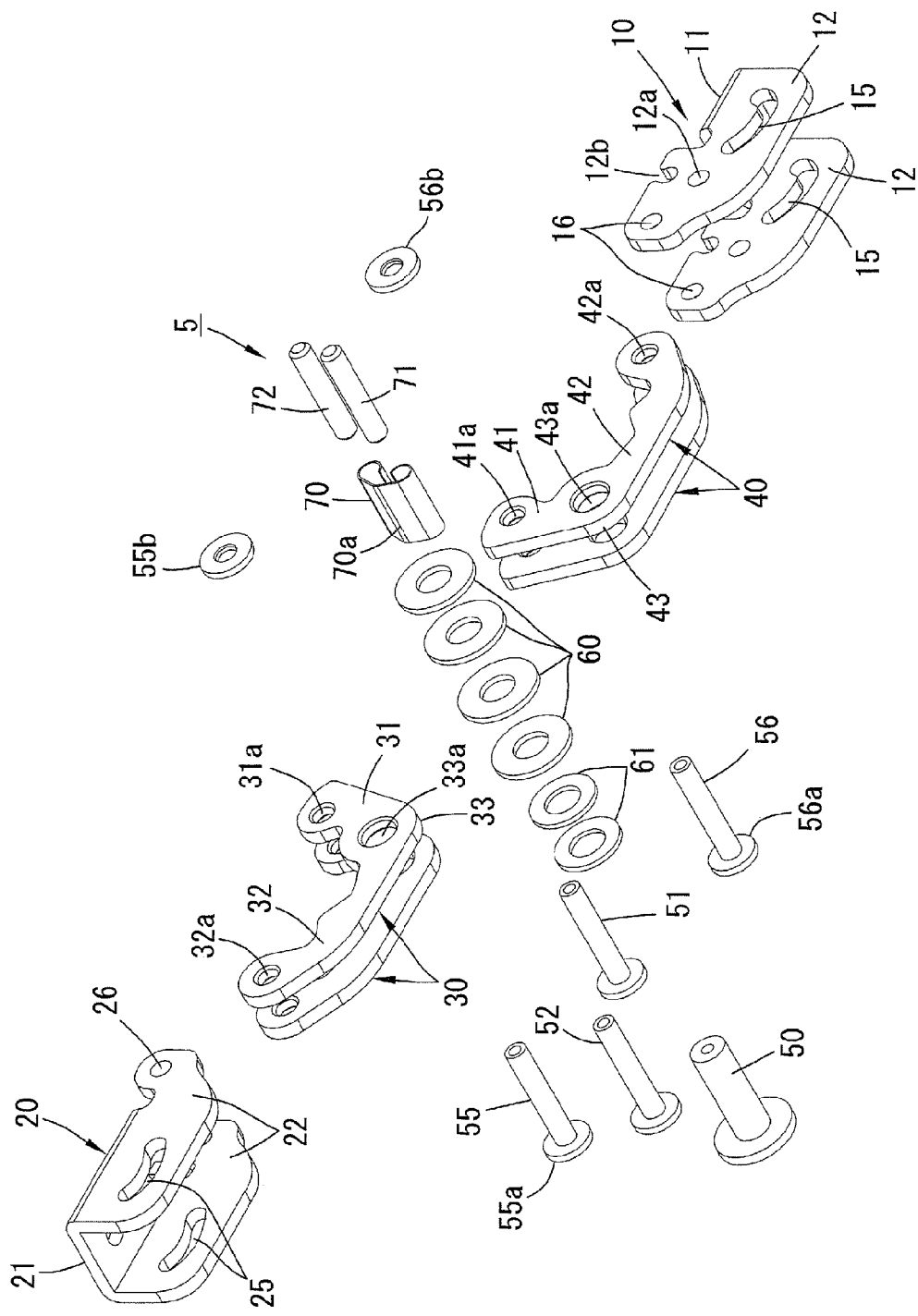
FIG. 4 is an exploded perspective view of the hinge device.

As shown in FIG. 4, each hinge device 5 includes a first hinge body 10 fixed to the case body 2, a second hinge body 20 fixed to the lid 3, two (plural) first arms 30 connecting the first and second hinge bodies 10 and 20 and two (plural) second arms 40 as main components.

The first hinge body 10 has a base wall 11 fixed to a lower surface of the support wall 2b of the case body 2 and a pair of side walls 12 that protrude downward at right angles from both side edges of the base wall 11 and are parallel to each other. The pair of side walls 12 extend to or near an edge of the opening 2a. In the pair of side walls 12, first guide grooves 15 (first guide) having the same shape are formed through a part separated from the opening 2a and bearing holes 16 are formed at tips of the pair of side walls 12 near the opening 2a.

The second hinge body 20 has a base wall 21 fixed to a vicinity of an edge on the support wall 2b side of a back surface of the lid 3 and a pair of side walls 22 that protrude at right angles from both side edges of the base wall 21 and are parallel to each other. Tips of the pair of side walls 22 extend to an edge of the lid 3. In the pair of side walls 22, second guide grooves 25 (second guide) having the same shape are formed through a part separated from the support wall 2b and bearing holes 26 are formed at the tips of the pair of side walls 22 near the edge of the lid 3.

The two first arms 30 are made of the same bent-shaped plate material and each have a short portion 31, a long portion 32 and an intermediate bent portion 33 at which the short portion 31 and the long portion 32 intersect. A bearing hole 31a and a support hole 32a are formed at tip portions of the short portion 31 and the long portion 32, respectively, and a bearing hole 33a having a slightly large diameter is formed in the bent portion 33.

The two second arms 40 are formed into the same shape as the first arm 30 and each have a short portion 41 and a long portion 42 in which a bearing hole 41a and a support hole 42a are formed at tip portions, respectively, and a bent portion 43 in which a bearing hole 43a having a slightly large diameter is formed.

Figure 2:
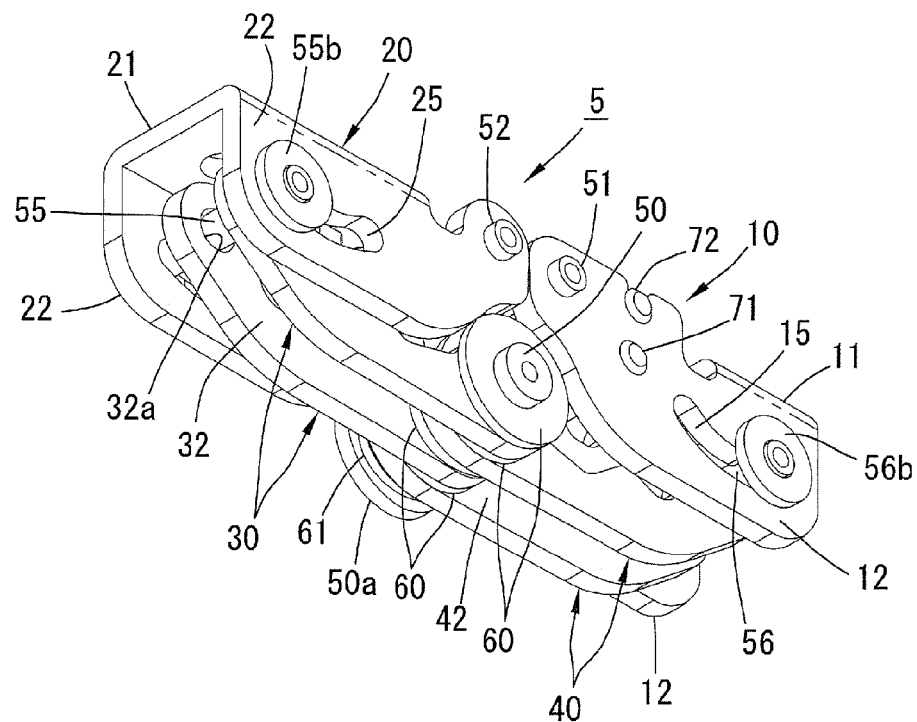
FIG. 2 is a perspective view of the hinge device as viewed from diagonally below.
Figure 3:
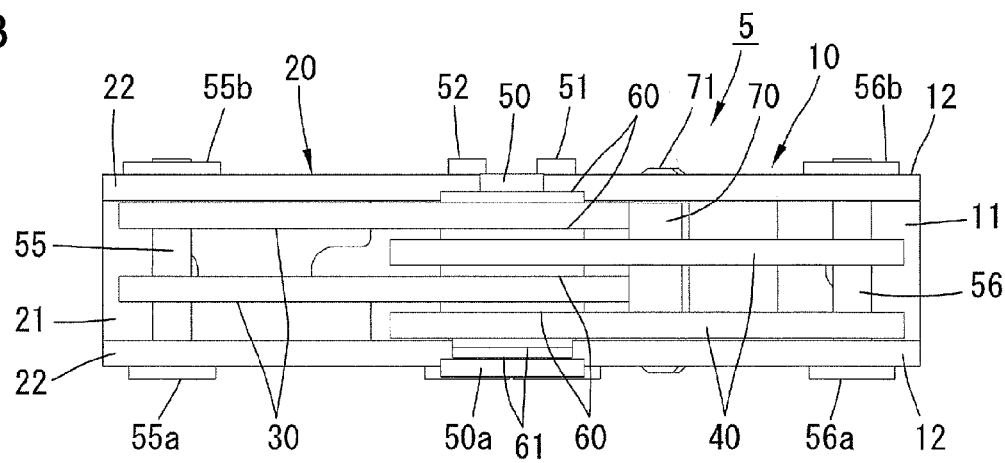
FIG. 3 is a bottom view of the hinge device.

As shown in FIGS. 2 and 3, the first arms 30 and the second arms 40 are arranged alternately and are connected so as to be relatively rotatable via an intermediate shaft member 50 inserted into the bearing holes 33a, 43a of the bent portions 33, 43.

The tip portions (one end portions of the first arms 30) of the short portions 31 of the two first arms 30 are arranged between the pair of side walls 12 of the first hinge body 10. The tip portions of the short portions 31 are rotatably connected to tip portions of the first hinge body 10 via a first shaft member 51 inserted into the bearing hole 31a of the short portion 31 and the bearing holes 16 of the pair of side walls 12 of the first hinge body 10.

Similarly, the tip portions (one end portion of the second arm 40) of the short portions 41 of the two second arms 40 are arranged between the pair of side walls 22 of the second hinge body 20. The tip portions of the short portions 41 are rotatably connected to tip portions of the second hinge body 20 via a second shaft member 52 inserted into the bearing hole 41*a* of the short portion 41 and the bearing holes 26 of the pair of side walls 22 of the second hinge body 20.

As described above, the first hinge body 10 and the second hinge body 20 are connected so as to be relatively rotatable via the first and second arms 30 and 40, and thus the lid 3 is connected to the case body 2 so as to be relatively rotatable.

The tip portions (the other end portion of the first arm 30) of the long portions 32 of the two first arms 30 are arranged between the pair of side walls 22 of the second hinge body 20. A slide pin 55 (first slide pin) is inserted through the support hole 32*a* at the tip of the long portion 32, and both ends of the slide pin 55 (first protrusion having a circular cross section) are slidably and rotatably inserted into the second guide grooves 25 of the pair of side walls 22 of the second hinge body 20. A flange portion 55*a* is formed at one end of the slide pin 55 and a washer 55*b* is fixed at the other end thereof. The flange portion 55*a* and the washer 55*b* are in contact with an outer surface of the pair of side walls 22 of the second hinge body 20 or face each other through a slight gap.

Similarly, the tip portions (the other end portion of the second arm 40) of the long portions 42 of the two second arms 40 are arranged between the pair of side walls 12 of the first hinge body 10. A slide pin 56 (second slide pin) is inserted through the support hole 42*a* at the tip of the long portion 42, and both ends of the slide pin 56 (second protrusion having a circular cross section) are slidably and rotatably inserted into the first guide grooves 15 of the pair of side walls 12 of the first hinge body 20. A flange portion 56*a* is formed at one end of the slide pin 56 and a washer 56*b* is fixed at the other end thereof. The flange portion 56*a* and the washer 56*b* are in contact with an outer surface of the pair of side walls 12 of the first hinge body 10 or face each other through a slight gap.

Figure 5:
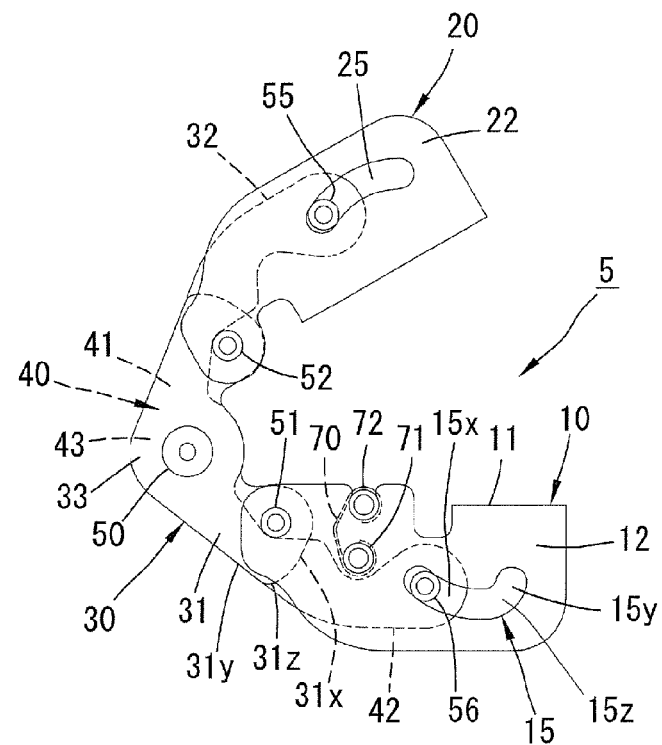
FIG. 5 is a side view showing the hinge device when the opening angle of the lid is 135°, omitting a washer and a flange portion in a foreground.
Figure 6:
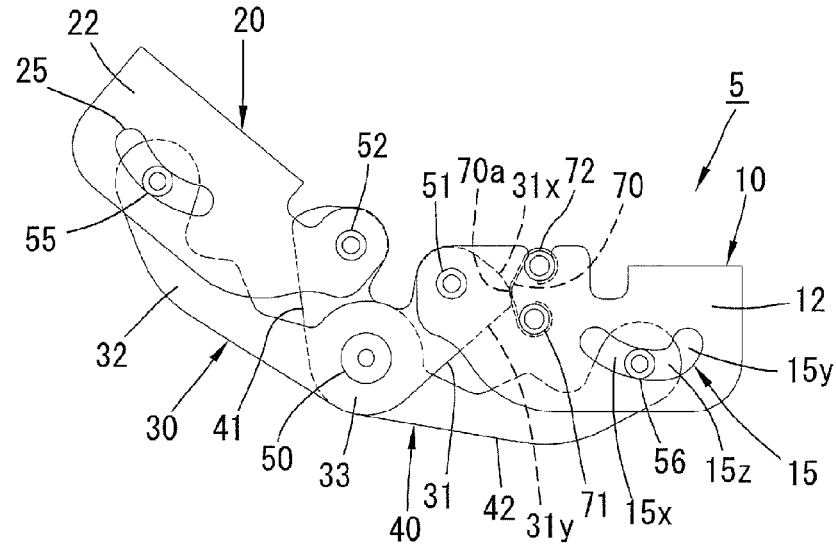
FIG. 6 is a diagram corresponding to FIG. 5 when the opening angle of the lid is 40°.

As shown in FIGS. 5 and 6, each of the first guide grooves 15 has a main groove portion 15*x* (main guide portion) extending in a direction approaching or separating from the first shaft member 51 and a sub-groove portion 15*y* (sub-guide portion) extending upward from one end of the main groove portion 15*x* (end away from the first shaft member 51). The main groove portion 15*x* and the sub-groove portion 15*y* intersect with each other via a bent portion 15*z* (intersection portion). The main groove portion 15*x* has a downwardly convex curved shape. The sub-groove portion 15*y* extends so as to draw an arc centered on the first shaft member 51.

The second guide groove 25 extends in a direction approaching or separating from the second shaft member 52 over the entire length thereof. In the present embodiment, the second guide groove 25 has a curved shape so as to be convex downward when the lid 3 is in the closed position.

As shown in FIG. 4, the hinge device 5 further includes four friction plates 60 (friction members) made of stainless steel or the like and two disc springs 61. The friction plates 60 and the disc springs 61 constitute a friction resistance generation mechanism. The friction plate 60 and the disc spring 61 are penetrated and supported by the intermediate shaft member 50. As shown in FIGS. 2 and 3, the disc spring 61 is interposed between a flange portion 50*a* on one end side of the intermediate shaft member 50 and the second arm 40, the three friction plates 60 are interposed between the first arm 30 and the second arm 40 and the one friction plate 60 is interposed between the other end of the intermediate shaft member 50 and the first arm 30.

The first and second arms 30 and 40 and the friction plate 60 make contact with each other with pressing force of the disc spring 61, which causes friction between the first and second arms 30 and 40. As a result, friction torque against a relative rotation of the second hinge body 20 with respect to the first hinge body 10 is generated, so that the lid 3 is stably maintained at an arbitrary opening angle. When changing the opening angle of the lid 3, it is necessary to apply a rotation torque that overcomes the friction torque.

As shown in FIGS. 4 and 5, the hinge device 5 further includes a leaf spring 70 (spring, energizing member) provided on the first hinge main body 10. Both ends of the leaf spring 70 have an arc shape and are hung on two support pins 71 and 72 supported by the pair of side walls 12 of the first hinge body 10. Both ends of the support pin 71 are inserted and supported in support holes 12*a* formed in the pair of side walls 12 and both ends of the support pin 72 are inserted and supported in a recess 12*b* formed on an edge of the side wall 12.

The leaf spring 70 has an obtuse angle and is formed into a bent shape, and a middle portion thereof is a pressing portion 70*a*. The pressing portion 70*a* protrudes toward the tip of the short portion 31 of the first arm 30. At the tip of the short portion 31, a first receiving surface 31*x* and a second receiving surface 31*y* for receiving the pressing portion 70*a* of the leaf spring 70 are formed, and a receiving surface 31*z* between the first receiving surface 31*x* and the second receiving surface 31*y* is curved.

An operation of the hinge device 5 having the above configuration will be described by taking as an example a process in which the lid 3 rotates from the fully opened position to the closed position.

When the lid 3 is in the fully opened position with the opening angle of 135° shown in FIG. 1, the long portion 32 of the first arm 30 makes contact with the second shaft member 52 and the long portion 42 of the second arm 40 makes contact with the first shaft member 51 as shown in FIG. 5, so that further rotation of the lid 3 in the opening direction is prohibited. In this state, the slide pin 55 of the first arm 30 is located near an end of the second guide groove 25 (an end closer to the second shaft member 52) and the slide pin 56 of the second arm 40 is located near an end of the main groove portion 15*x* of the first guide groove 15 (an end closer to the first shaft member 51). The leaf spring 70 is separated from the short portion 31 of the first arm 30.

In the process of rotating the lid 3 from the position of the opening angle of 135° to the position of the opening angle of 40°, the first and second arms 30 and 40 rotate relative to the first and second hinge bodies 10 and 20 and the first and second arms 30 and 40 rotate relative to each other. At this time, since the slide pin 55 slides along the second guide groove 25 and the slide pin 56 slides along the main groove portion 15*x* of the first guide groove 15, the loci of the relative rotations of the first and second arms 30, 40 and the second hinge body 20 with respect to the first hinge body 10 are uniquely determined, so that the lid 3 can be stably opened.

Since the friction generated by the friction plate 60 causes the friction torque with respect to the second hinge body 20 and thus the lid 3 when the first and second arms 30 and 40 rotate relative to each other, the lid 3 is stably held at an arbitrary angle position in the opening angle range of 135° to 40° as long as the rotation torque exceeding the friction torque is not applied to the lid 3 from an outside.

In this regard, by making the main groove portion 15x of the first guide groove 15 and the second guide groove 25 into an arc shape, the friction torque can be made almost uniform over the above angle range.

When the opening angle of the lid 3 reaches 40°, as shown in FIG. 6, the pressing portion 70a of the leaf spring 70 makes contact with the first receiving surface 31x of the short portion 31 of the first arm 30. The slide pin 56 of the second arm 40 is located in the main groove portion 15x of the first guide groove 15.

Further, in the process of rotating the lid 3 from the opening angle of 40° to the opening angle of 20°, since the pressing portion 70a of the leaf spring 70 presses the first receiving surface 31x at the end of the short portion 31 of the first arm 30, the rotation torque in a clockwise direction in the drawings acts on the first arm 30 and thus the rotation torque in the opening direction acts on the second hinge body 40 and the lid 3. However, in the present embodiment, the rotation torque in the opening direction is smaller than the friction torque due to the friction plate 60, so that the closing operation is not a large burden. The lid 3 can stably maintain an arbitrary angle position even in the angle range of the opening angle of 40° to 20°.

Figure 7A:
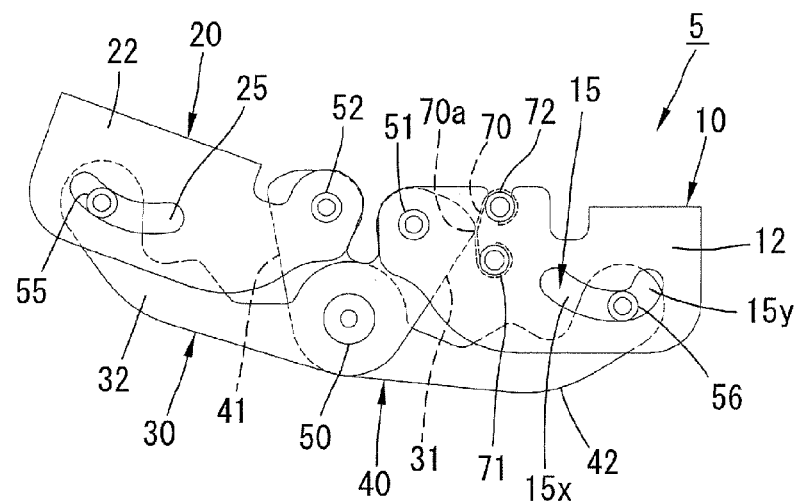
FIG. 7A is a diagram corresponding to FIG. 5 when the opening angle of the lid is 20°.
Figure 7B:
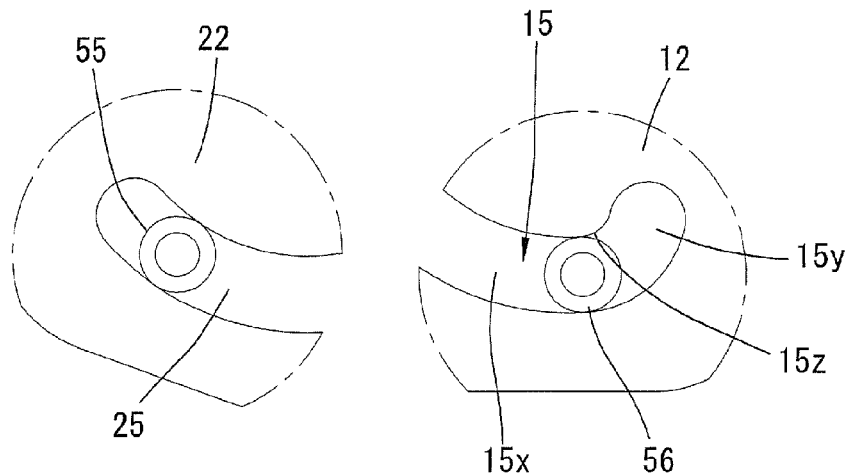
FIG. 7B is an enlarged side view of first and second guide grooves and a slide pin when the opening angle of the lid is 20°.
Figure 7C:
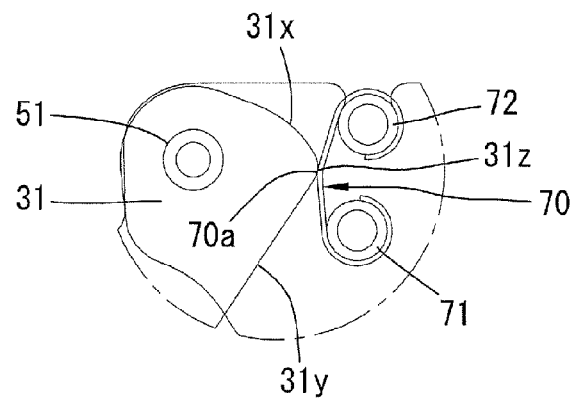
FIG. 7C is an enlarged side view of a leaf spring and an end of a first arm when the opening angle of the lid is 20°.

When the opening angle of the lid 3 reaches 20°, as shown in FIGS. 7A and 7C, the pressing portion 70a of the leaf spring 70 is in contact with the intermediate receiving surface 31z of the short portion 31 of the first arm 30, so that the rotational torque applied to the first arm 30 temporarily becomes zero. As shown in FIG. 7B, the slide pin 56 of the second arm 40 is still located in the main groove portion 15x of the guide groove 15 and has not reached the bent portion 15z.

Figure 8A:
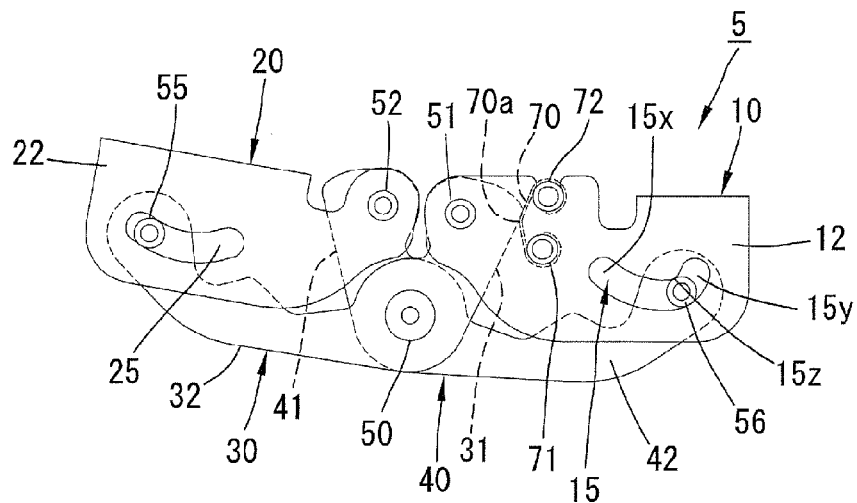
FIG. 8A is a diagram corresponding to FIG. 5 when the opening angle of the lid is 10°.
Figure 8B:
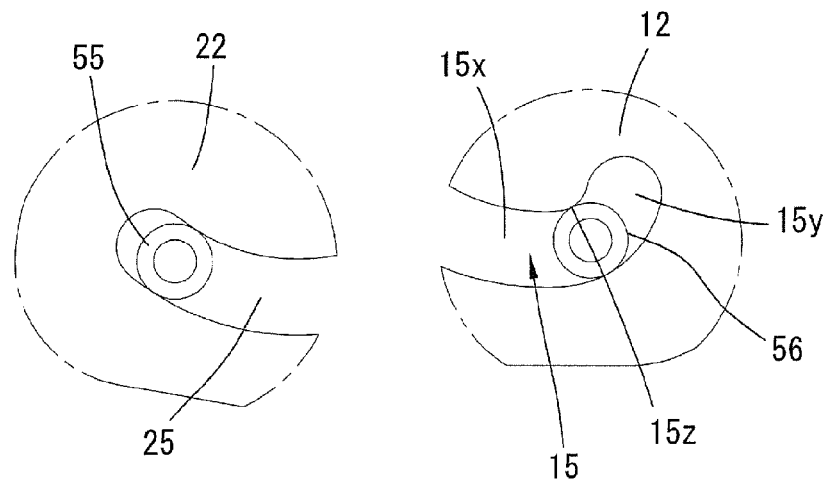
FIG. 8B is an enlarged side view of the first and second guide grooves and the slide pin when the opening angle of the lid is 10°.
Figure 8C:
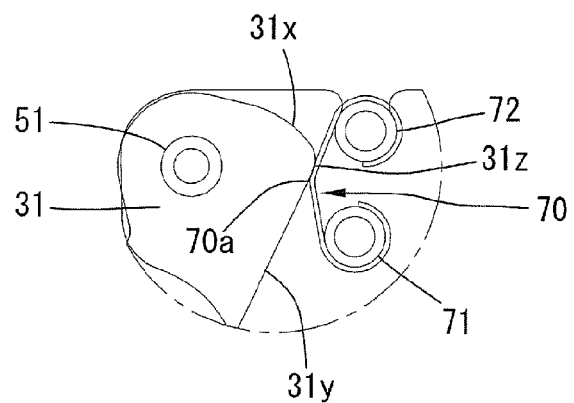
FIG. 8C is an enlarged side view of the leaf spring and the end of the first arm when the opening angle of the lid is 10°.

In the process of rotating the lid 3 from the opening angle of 20° to the opening angle of 10°, as shown in FIGS. 8A and 8C, since the pressing portion 70a of the leaf spring 70 presses the second receiving surface 31y of the short portion 31 of the first arm 30, the rotation torque in a counterclockwise direction in the drawing is applied to the first arm 30 and thus the rotation torque in the closing direction is applied to the second hinge body 20 and the lid 3. In this regard, when the opening angle of the lid 3 exceeds 20°, the direction of the rotational torque due to the leaf spring 70 changes, so that the operator can feel a click feeling.

In the present embodiment, since the rotation torque in the closing direction by the leaf spring 70 is smaller than the friction torque by the friction plate 60, the lid 3 can stably maintain an arbitrary opening angle even in the angle range of 20° to 10°.

When the opening angle of the lid 3 reaches 10°, as shown in FIG. 8B, the slide pin 56 of the second arm 40 approaches the bent portion 15z of the first guide groove 15, but does not reach the sub groove portion 15y.

Figure 9A:
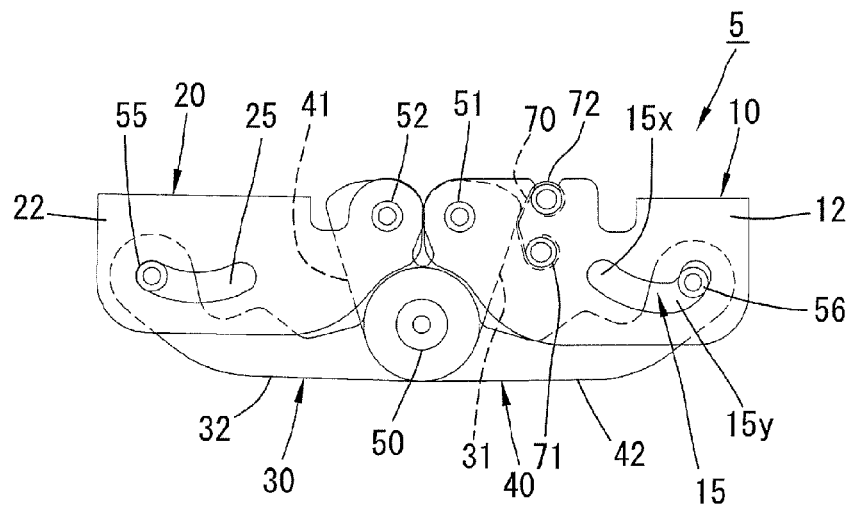
FIG. 9A is a diagram corresponding to FIG. 5 when the opening angle of the lid is 1°.
Figure 9B:
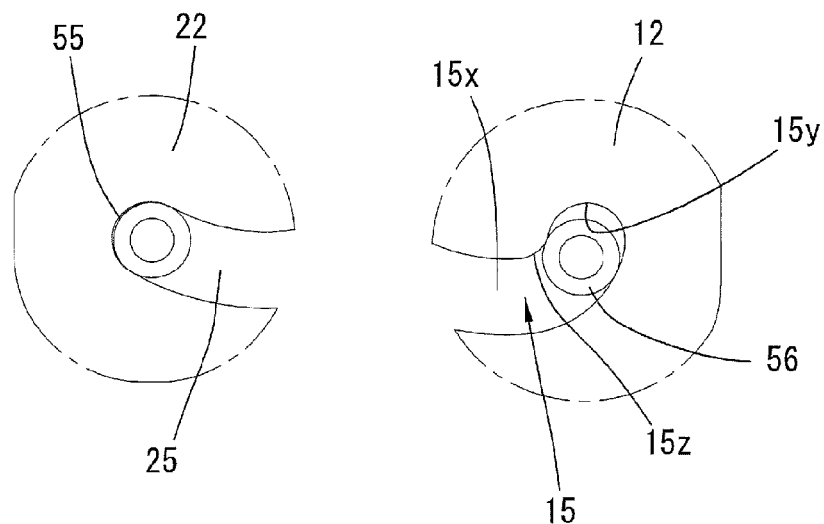
FIG. 9B is an enlarged side view of the first and second guide grooves and the slide pin when the opening angle of the lid is 1°.
Figure 9C:
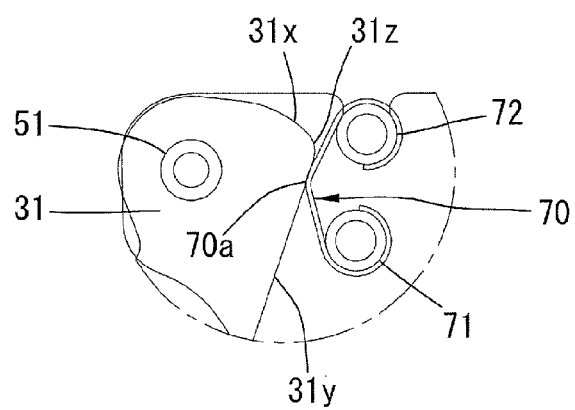
FIG. 9C is an enlarged side view of the leaf spring and the end of the first arm when the opening angle of the lid is 1°.

When the lid 3 is further rotated from the opening angle of 10° to the opening angle of 1°, as shown in FIGS. 9A and 9B, the slide pin 55 reaches the end of the second guide groove 25 (end far from the second shaft member 52) and the slide pin 56 reaches the end of the sub groove portion 15y (the end on the main groove portion 15x side). When the force in the closing direction is released in the middle of the rotation, the lid 3 maintains its angular position as in the case of the opening angle of 10° to 135°. As shown in FIG. 9C, the rotation torque to the first arm 30 (rotation torque in the closing direction to the lid 3) by the leaf spring 70 is applied because this rotation torque is relatively weak and the friction resistance due to contact between the slide pin 56 and the first guide groove 15 is applied.

As described above, when a hand is released from the state that the opening angle of the lid 3 becomes 1° and the slide pin 56 reaches the end of the sub-groove portion 15y of the first guide groove 15, the slide pin 56 automatically moves along the sub-groove portion 15y and the lid 3 automatically rotates to the closed position. This reason will be explained below.

Since the sub-groove portion 15y is formed so as to draw the arc centered on the first shaft member 51, the slide pin 56 can move along the locus drawing the arc centered on the first shaft member 51. Therefore, an assembly including the lid 3, the second hinge body 20 and the first and second arms 30 and 40 is integrally rotated around the first shaft member 51 without being accompanied by relative rotation with each other. In this process, the frictional resistance between the slide pin 56 and the first guide groove 15 becomes substantially zero.

On the other hand, even when the opening angle of the lid 3 is less than 1°, the pressing portion 70a of the leaf spring 70 presses the second receiving surface 31y of the short portion 31 of the first arm 30, so that the state in which the rotation torque is applied to the first arm 30 in the counterclockwise direction is maintained and the rotation torque causes the second hinge body 20 and the lid 3 to automatically rotate to the closed position.

Figure 10A:
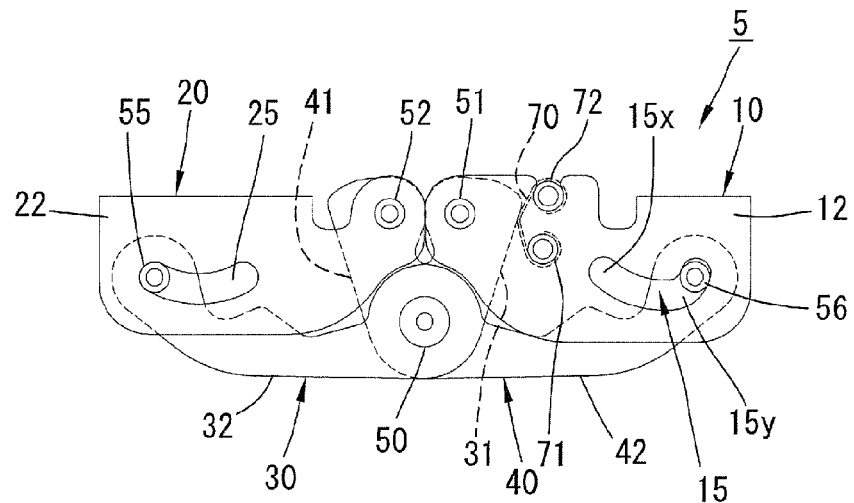
FIG. 10A is a diagram corresponding to FIG. 5 when the opening angle of the lid is 0°.
Figure 10B:
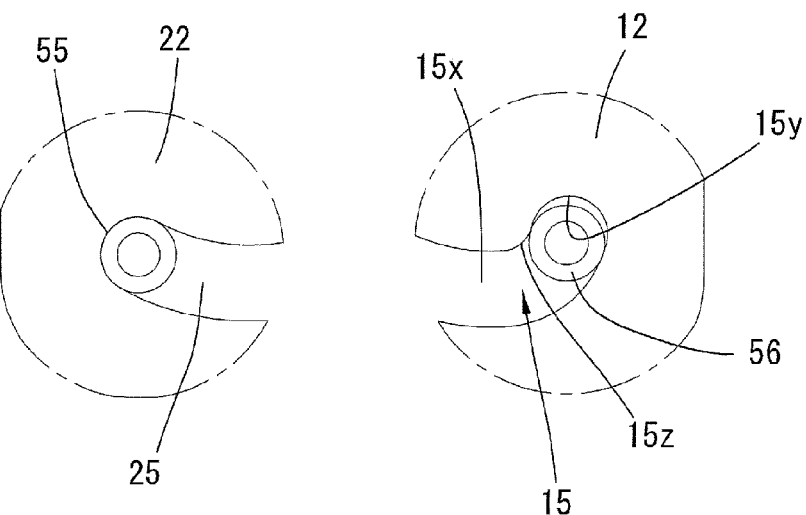
FIG. 10B is an enlarged side view of the first and second guide grooves and the slide pin when the opening angle of the lid is 0°.
Figure 10C:
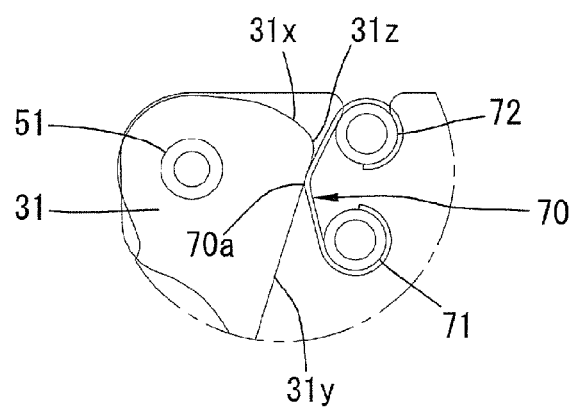
FIG. 10C is an enlarged side view of the leaf spring and the end of the first arm when the opening angle of the lid is 0°.

As shown in FIG. 10, when the opening angle of the lid 3 is 0°, the slide pin 56 does not reach the end of the sub-groove portion 15y of the first guide groove 15 and there is an allowance between the slide pin 56 and the end of the secondary groove portion 15y. Therefore, even if the opening angle of the lid 3 is 0°, the state in which the rotational torque by the leaf spring 70 is applied to the lid 3 can be reliably maintained and the closed state of the lid 3 can be stably maintained.

In the state where the hinge device 5 is not attached to the case 1, the second hinge body 20 can rotate relative to the first hinge body 10 until the slide pin 56 further reaches the end of the sub-groove portion 15y. The angular position when the slide pin 56 reaches the end of the sub-groove portion 15y is defined as a rotation limit position of the hinge device 5. In the present embodiment, assuming that the position shown in FIG. 9 (the position when the lid 3 is closed) is 0°, $-\alpha°$ (for example, $-2°$) is the rotation limit position.

In the present embodiment, in the angle range of the relative rotation of the second hinge body 20 with respect to the first hinge body 10, since the angle range (torque applying angle range) in which the rotation torque of the leaf spring 70 is applied is as wide as $-\alpha°$ to 20° compared to the angle range (specific angle range) $-\alpha°$ to 1° where the frictional resistance is substantially zero, the second hinge body 30 can be reliably and automatically rotated toward the rotation limit position over the entire range of the specific angle range.

In the present embodiment, in order to apply the rotational torque, the leaf spring 70 provided with both ends having the arc shape and the middle protruding is used, so that a simple structure can be obtained. Further, even if the first arm 30 is made of a thin plate and has a plurality of them, the leaf spring 70 can surely apply the rotational torque to the plurality of first arms 30.

Figure 11A:
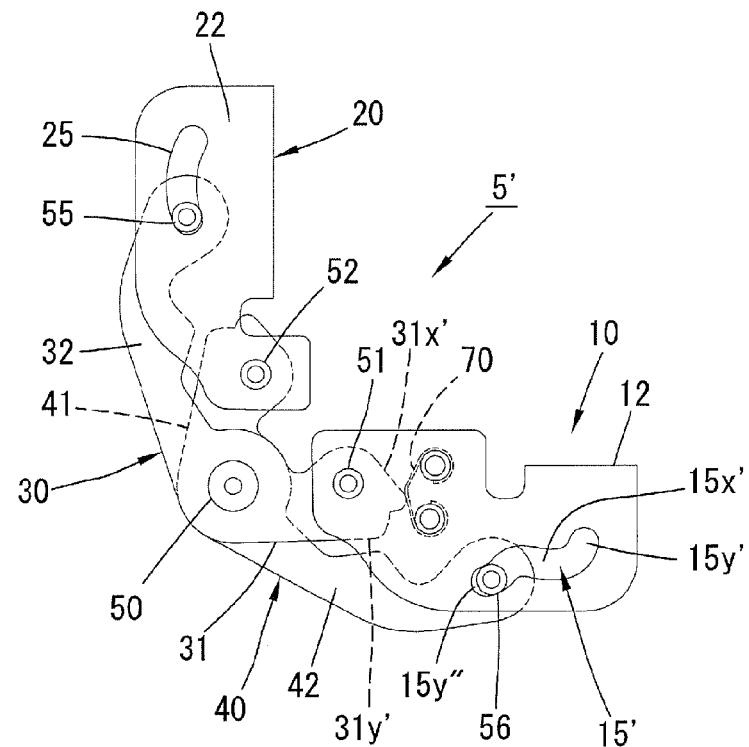
FIG. 11A is a side view of the hinge device when the opening angle of the lid is 90° (fully opened position) in a second embodiment of the present invention.
Figure 11B:
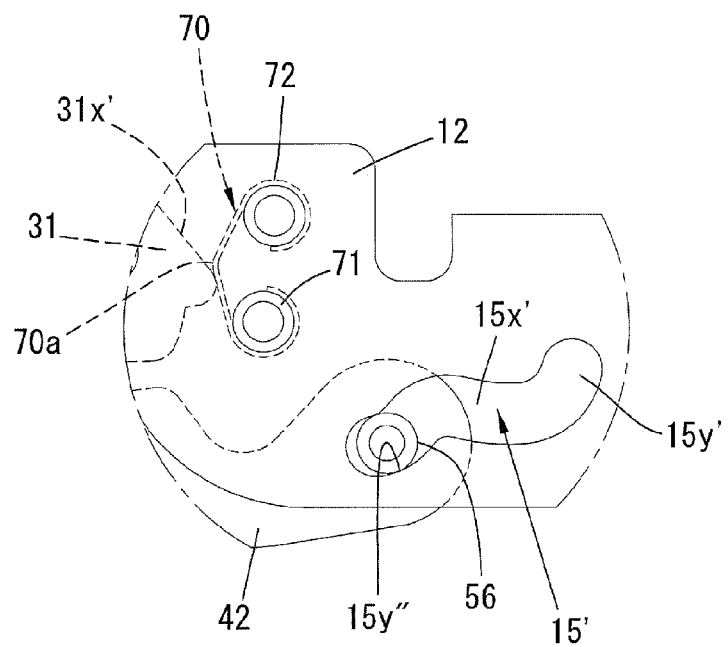
FIG. 11B is an enlarged side view of a region including the first guide grooves, the slide pin, the leaf spring and the end of the first arm when the opening angle of the lid is 90° (fully opened position) in the second embodiment.
Figure 12A:
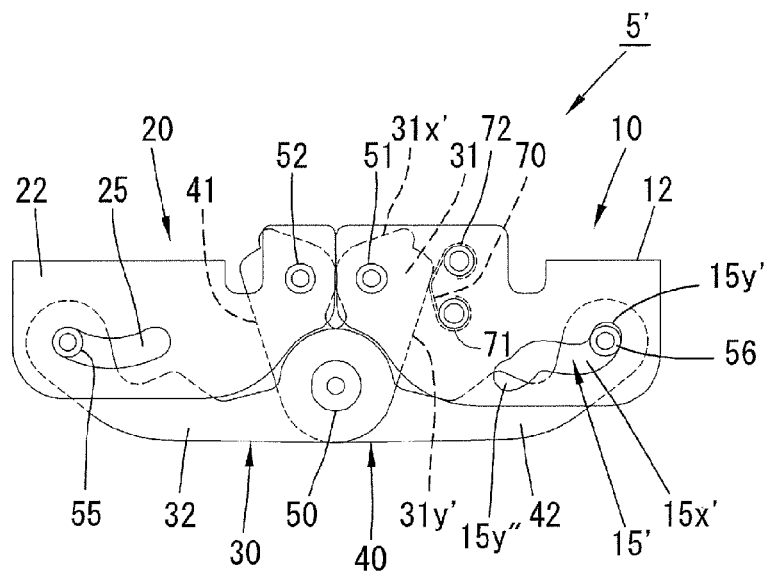
FIG. 12A is a diagram corresponding to FIG. 11A when the opening angle of the lid is 0° (closed position) in the second embodiment.
Figure 12B:
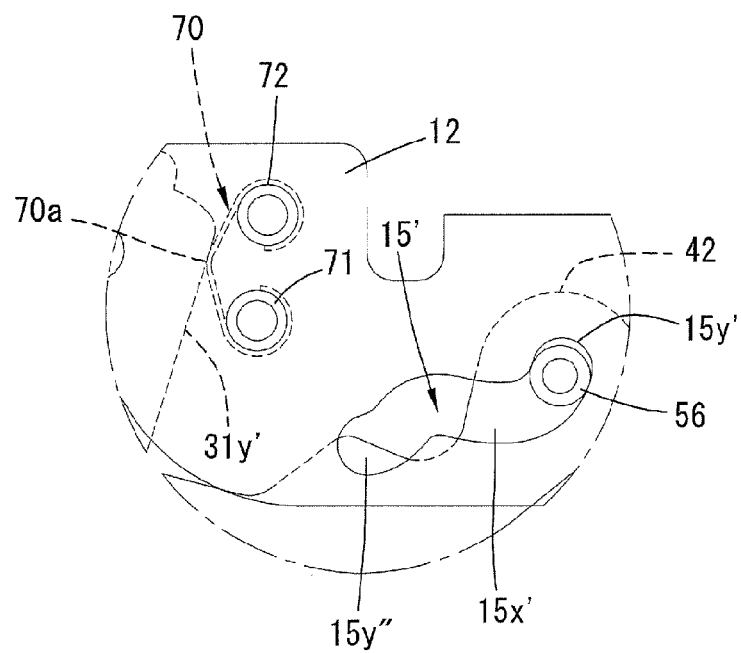
FIG. 12B is a diagram corresponding to FIG. 11B when the opening angle of the lid is 0° (closed position) in the second embodiment.

Next, a second embodiment of the present invention will be described with reference to FIGS. 11 and 12. Since the basic configuration of the hinge device 5 of the present embodiment is the same as that of the first embodiment, the same numbers are assigned to the respective components and duplicate description will be omitted. Further, reference numerals of the first embodiment are used for the description of the components not shown in FIGS. 11 and 12.

In the present embodiment, a catching function is exhibited when the lid 3 is in the closed position with the opening angle of 0° and the fully opened position with the opening angle of 90°. The details will be described below.

The first guide groove 15' has a main groove portion 15x' (main guide portion), a sub-groove portion 15y' (sub-guide portion) connected to one end of the main groove portion 15x' (end far from the first shaft member 51) and another sub-groove portion 15y' (another sub-guide portion) connected to the other end of the main groove portion 15x (end close to the first shaft member 51). The main groove portion 15x' extends in the direction approaching or separating from the first shaft member 51. The sub-groove portions 15y' and 15y' extend in the direction intersecting the main groove portion 15x'. Specifically, in the present embodiment, the sub-groove portions 15y' and 15y' extend from the intersection with the main groove portion 15x' so as to draw the arc centered on the first shaft portion 51. The sub-groove portions 15y', 15' extend in the opposite directions to each other. That is, the sub-groove portion 15y' extends upward and the sub-groove portion 15y' extends downward.

The tip of the short portion 31 of the first arm 30 has a first receiving surface 31x' and a second receiving surface 31y' away from the first receiving surface 31x' in a circumferential direction.

When the opening angle of the lid 3 exceeds 70°, the pressing portion 70a of the leaf spring 70 pushes the first receiving surface 31x', so that the clockwise rotation torque is applied to the first arm 30 and thus the rotation torque in the opening direction is applied to the lid 3. When the opening angle of the lid 3 exceeds 80°, the slide pin 56 enters the sub-groove portion 15y', so that the frictional resistance becomes substantially zero. As a result, the lid 3 is automatically rotated in the opening direction and is held at the opening angle of 90° (fully opened position) in a state where the rotation torque is applied.

When the opening angle of the lid 3 is less than 20°, the pressing portion 70a of the leaf spring 70 pushes the second receiving surface 31y', so that the counterclockwise rotation torque is applied to the first arm 30 and thus the rotation torque in the closing direction is applied to the lid 3. When the opening angle of the lid 3 is less than 10°, the slide pin 56 enters the sub-groove portion 15y', so that the frictional resistance becomes substantially zero. As a result, the lid 3 is automatically rotated in the closing direction and is held at a closing angle of 0° (closed position) in a state where the rotation torque is applied.

Next, a third embodiment of the present invention will be described with reference to FIGS. 13 to 15. Since the basic configuration of the hinge device 5' of the present embodiment is the same as that of the first embodiment, the same numbers are assigned to the respective components and duplicate description will be omitted. Further, reference numerals of the first embodiment are used for the description of the components not shown in FIGS. 13 to 15.

Figure 15:
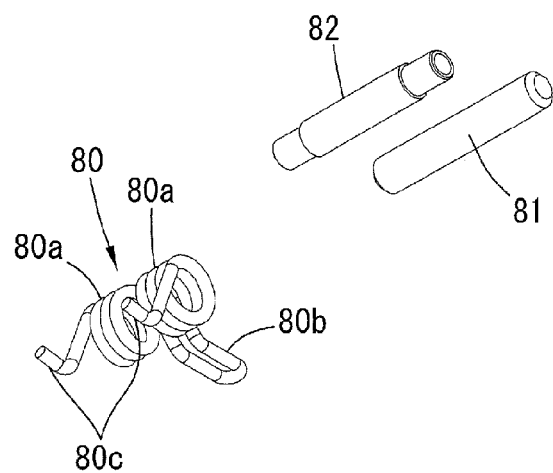
FIG. 15 is a perspective view showing a torsion spring and its accessories used in the third embodiment.

In this embodiment, a torsion spring 80 shown in FIG. 15 is used instead of the leaf springs of the first and second embodiments. The torsion spring 80 integrally has two coil portions 80a, an U-shaped locking portion 80b connected to the coil portions 80a and bent-shaped pressing portions 80c extending from the two coil portions 80a to the opposite side of the locking portion 80b, respectively. Along with the torsion spring 80, a pressing pin 82 including a support pin 81 and a stepped pin is used.

Figure 13:
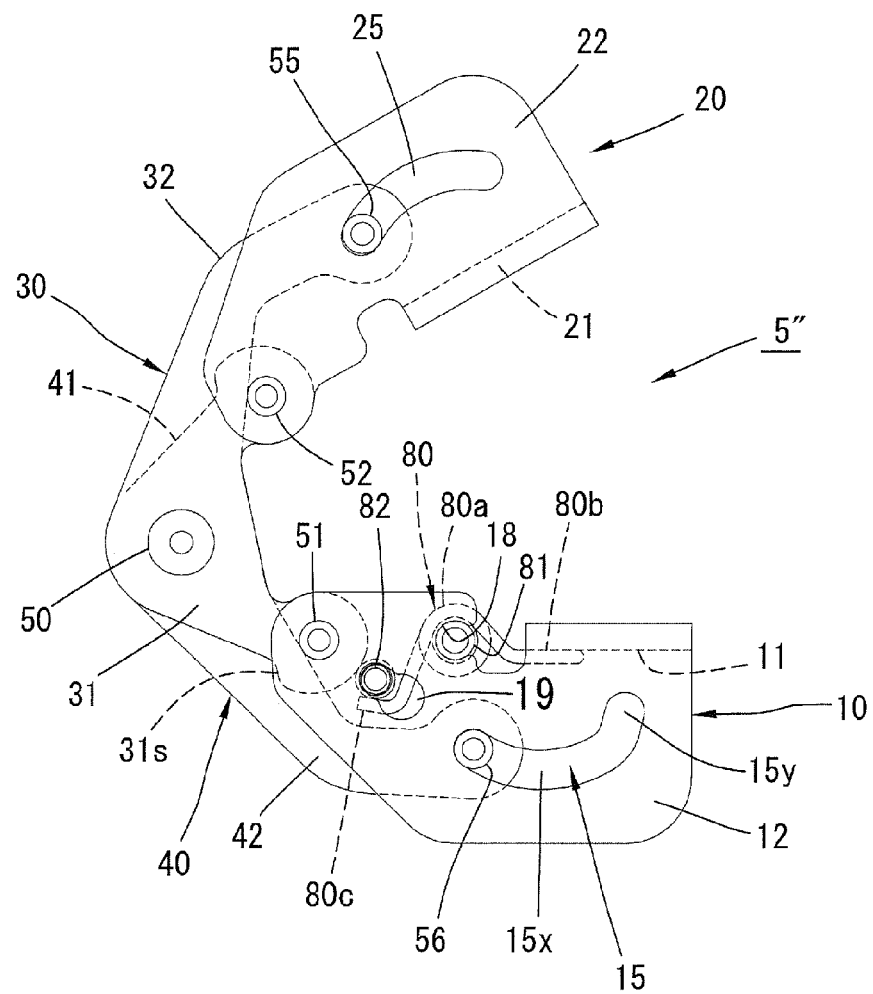
FIG. 13 is a side view of the hinge device when the opening angle of the lid is 150° (fully opened position) in a third embodiment of the present invention.
Figure 14:
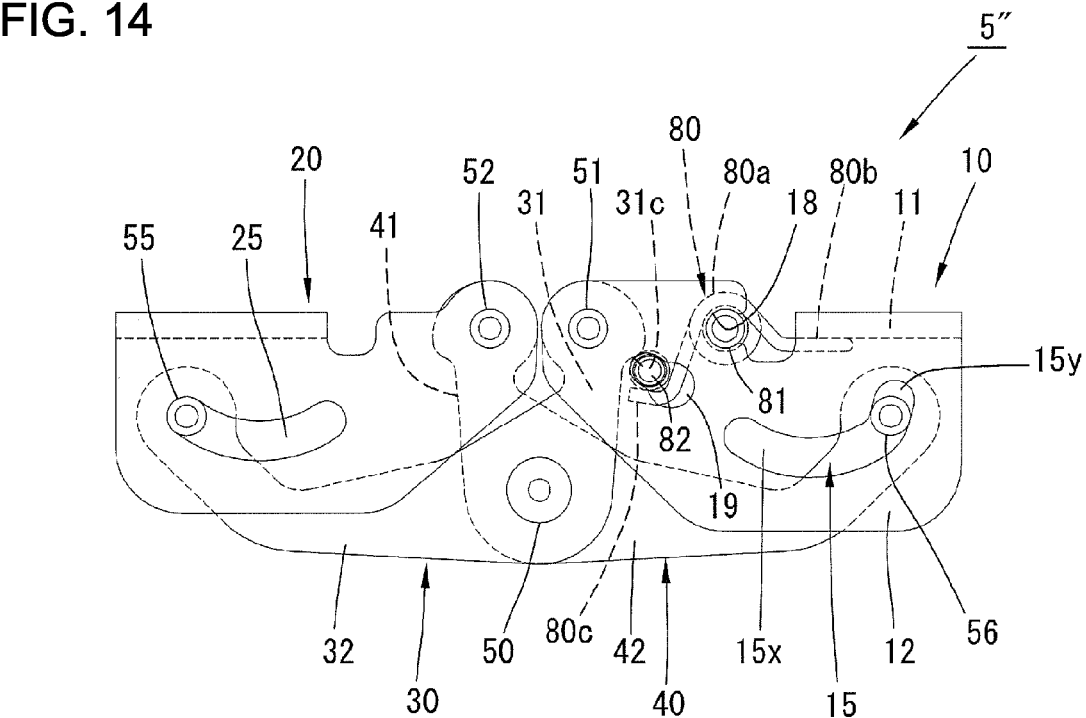
FIG. 14 is a side view of the hinge device when the opening angle of the lid is 0° (closed position) in the third embodiment.

As shown in FIGS. 13 and 14, the torsion spring 80 is supported by the first hinge body 10 via the support pin 81. The support pin 81 is inserted through the coil portion 80a of the torsion spring 80 and both ends thereof are supported by the support holes 18 formed in the pair of side walls 12 of the first hinge body 10. The locking portion 80b of the torsion spring 80 is locked to the base wall 11 of the first hinge body 10.

A peripheral surface of the tip end portion of the short portion 31 of the first arm 30 has a first surface region forming an arc surface, a second surface region where diameter gradually increases in the clockwise direction in the drawing from the first surface region and further a third surface region where the diameter sharply decreases in the clockwise direction and the third surface region is provided as a receiving surface 31s having an operation described later.

An elongated holes 19 are formed in the pair of side walls 12 of the first hinge body 10 in the vicinity of the tip end portion of the short portion 31 of the first arm 30 and both ends of the pressing pin 82 are slidably inserted into the elongated hole 19 along the elongated hole 19. The pressing pin 82 is always energized toward the tip of the short portion 31 of the first arm 30 by the pressing portion 80c of the torsion spring 80 described above.

The basic operation of the third embodiment is the same as that of the first embodiment. When the lid 3 is in the fully opened position with the opening angle of 150°, the slide pin 56 is located in the main groove portion 15x of the first guide groove 15 and the pressing pin 82 is in contact with a first region forming an arc surface in the peripheral surface of the short portion 31 of the first arm 30. Therefore, no rotation torque is applied to the first arm 30. When the lid 3 is at the opening angle of 150° to 20°, the lid 3 is held at an arbitrary opening angle by the friction torque of the friction plate 60.

When the lid 3 is at the opening angle of 20° to 0°, the pressing pin 82 makes contact with the receiving surface 31s of the first arm 30 and the pressing force of the torsion spring 30 is applied to the receiving surface 31s via the pressing pin 82. As a result, the rotation torque in the counterclockwise direction is applied to the first arm 30 and the rotation torque in the closing direction is applied to the lid 3.

As shown in FIG. 14, when the lid 3 has the opening angle of 1° to 0°, the slide pin 56 enters the sub-groove portion 15y of the first guide groove 15 and the friction resistance becomes substantially zero, so that due to the rotational torque of the torsion spring 80, the lid 3 is integrated with the first and second arms 30, 40 and the second hinge body 20 and automatically rotates in the closing direction.

Next, a fourth embodiment of the present invention will be described with reference to FIGS. 16 and 17. The fourth embodiment differs from the third embodiment only in the shape of the first guide groove 100. Other components (not shown) are the same as those in the third embodiment and the reference numerals of the third embodiment are used for the description of these components.

Similar to the preceding embodiment, the first guide groove 100 has a main groove portion 101, a sub groove portion 102 and a bent portion 103 (intersection portion). The slide pin 56 is inserted into the main groove portion 101 with a predetermined clearance, for example, a clearance of 50 μm to 100 μm. This point is the same as the preceding embodiment.

Figure 16A:
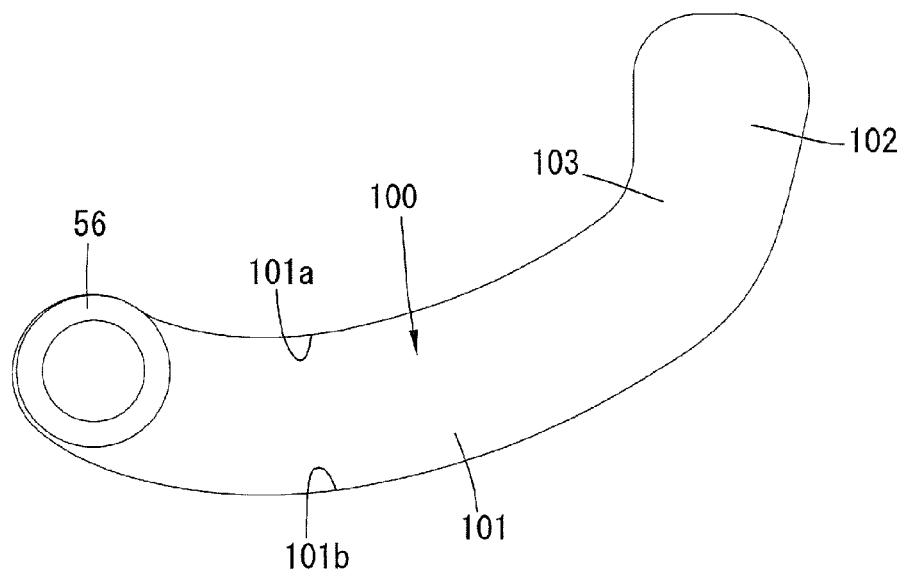
FIG. 16A is an enlarged side view showing the first guide grooves and the slide pin when the opening angle of the lid is 15° in the hinge device according to a fourth embodiment of the present invention.
Figure 16B:
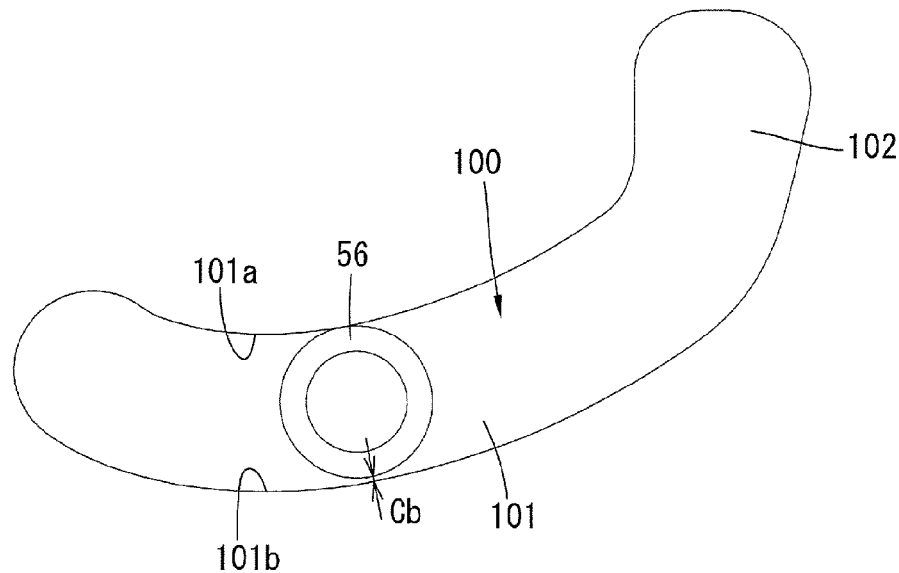
FIG. 16B is a diagram corresponding to FIG. 16A when the opening angle of the lid is 60° in the fourth embodiment.

As shown in FIG. 16A, when the lid 3 is in the fully opened position with the opening angle of 150°, the slide pin 56 is located at the end of the main groove portion 101 (the end close to the first shaft member 51). FIG. 16B shows the position of the slide pin 56 while the lid 3 is being rotated in the closing direction, for example, when the opening angle of the lid 3 is 60°. As shown in FIG. 16B, when the lid 3 is rotating in the closing direction, the slide pin 56 moves so as to make contact with an upper edge 101a of the main groove portion 101 and a clearance Cb appears between a lower edge 101b of the main groove portion 101 and the slide pin 56.

Figure 17A:
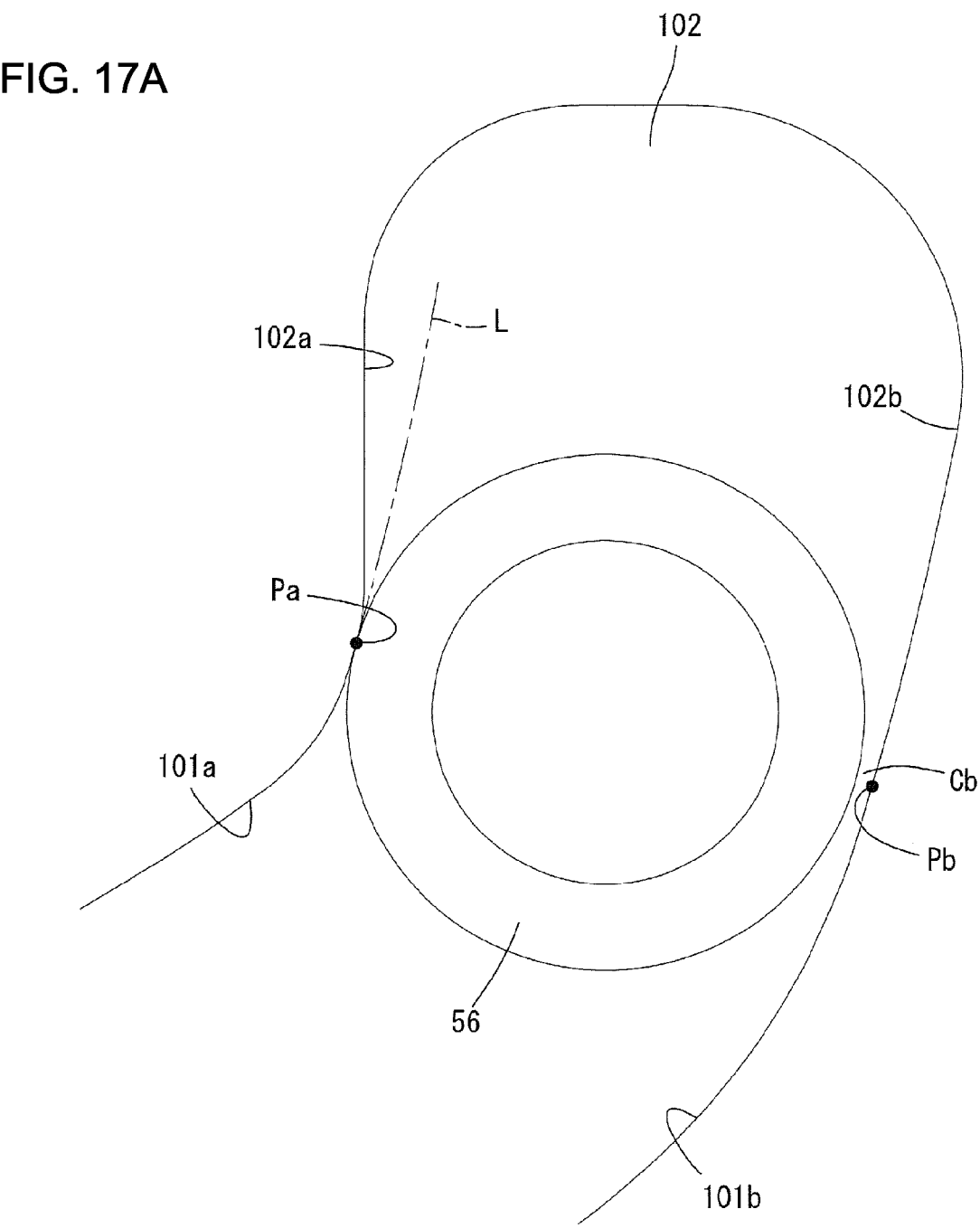
FIG. 17A is a side view showing the first guide grooves and the slide pin when the opening angle of the lid is 0.86° in the fourth embodiment in an enlarged manner.

In the present embodiment, as in the third embodiment, when the lid 3 opens below the opening angle of 20°, the rotation torque by the torsion spring 80 is applied to the lid 3. In this embodiment, when the lid 3 reaches the opening angle of less than 2°, for example 0.86°, the slide pin 56 reaches the sub-groove portion 102 of the first guide groove 100 as shown in FIG. 17A. At a higher opening angle, the lid 3 is maintained at an arbitrary angle by the same principle as in the above-described embodiment.

In FIG. 17A, an inner point Pa in the bent portion 103 (the side closer to the first shaft member 51) is the intersection of an upper edge 101a of the main groove portion 101 and an inner edge 102a of the sub-groove portion 102. An outer point Pb in the bent portion 103 (the side far from the first shaft portion 51) is the intersection of a lower edge 101b of the main groove portion 101 and an outer edge 102b of the sub-groove portion 102. When the lid 3 is rotated in the closing direction, the slide pin 56 is in contact with the inner point Pa and the clearance Cb appears between the point Pb and the slide pin 56.

As shown in FIG. 17A, the outer edge 102b of the sub-groove portion 102 is formed on an arc centered on the first shaft member 51 from the point Pb on an outer side of the bent portion 103. The inner edge 102a of the sub-groove portion 102 is deviated from the point Pa inside the bent portion 103 so as to be closer to the first shaft member 51 than a virtual line L drawing an arc centered on the first shaft member 51. The clearance between the inner edge 102a and the virtual line L gradually increases as it approaches an inner end of the sub-groove portion 102. The inner edge 102a draws a curve near the point Pa and draws a straight line behind it.

Figure 17B:
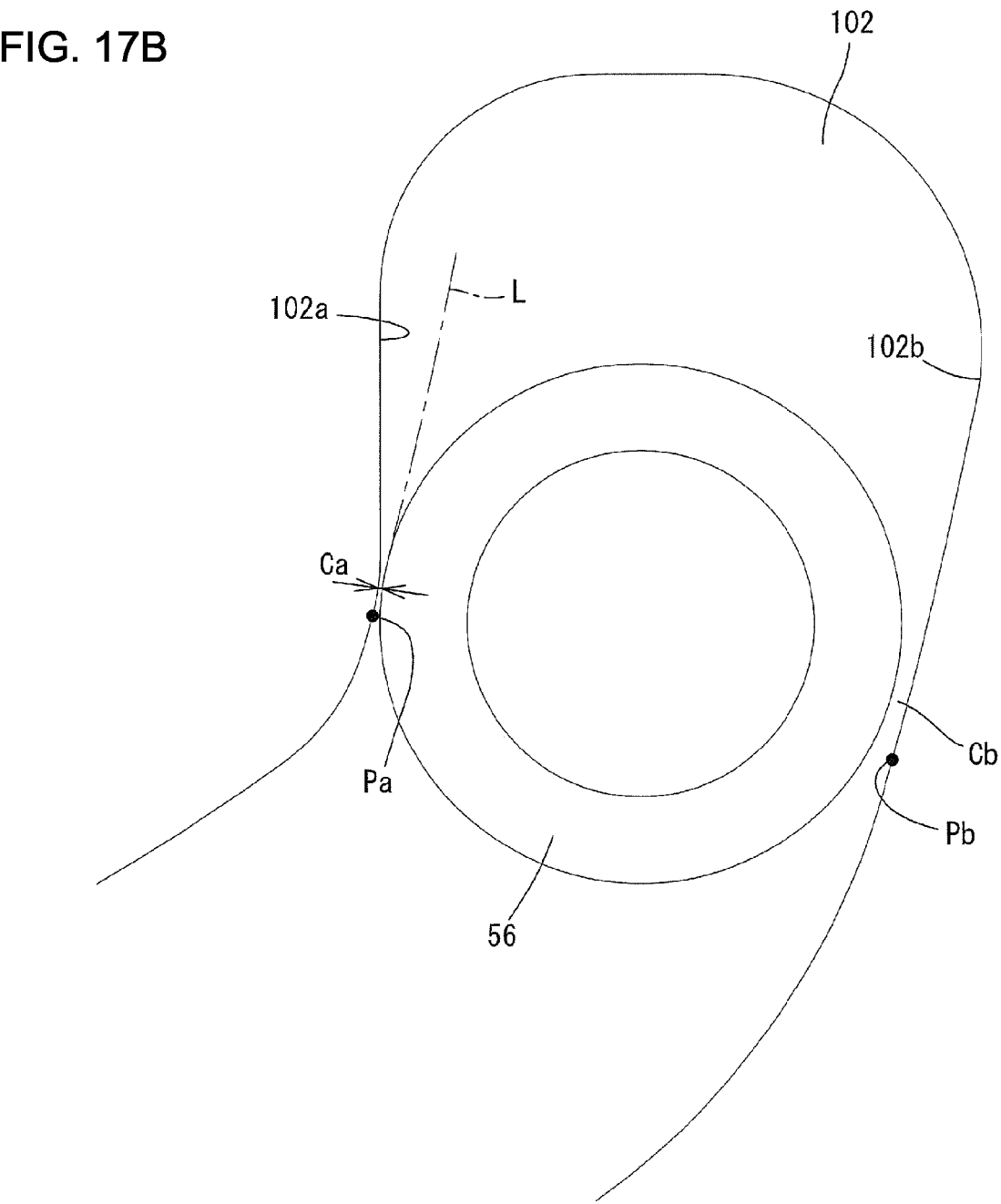
FIG. 17B is a diagram corresponding to FIG. 17A when the opening angle of the lid is 0° in the fourth embodiment.

When the lid 3 further rotates in the closing direction and the opening angle reaches 0°, that is, the closing position, the slide pin 56 moves to the position shown in FIG. 17B. At this position, the clearance Cb appears between the slide pin 56 and the outer edge 102b of the sub-groove portion 102. Further, a clearance Ca appears between the slide pin 56 and the inner edge 102a of the sub-groove portion 102. In this embodiment, the clearance Ca is about 10 μm.

When the lid 3 is in the closed position as described above, the slide pin 56 does not make contact with any of the edges 102a and 102b of the sub-groove portion 102, so that the friction resistance due to such contact can be surely reduced to zero. As a result, even if the force of the torsion spring 80 is weak, the closed state of the lid 3 can be reliably maintained.

Figure 17C:
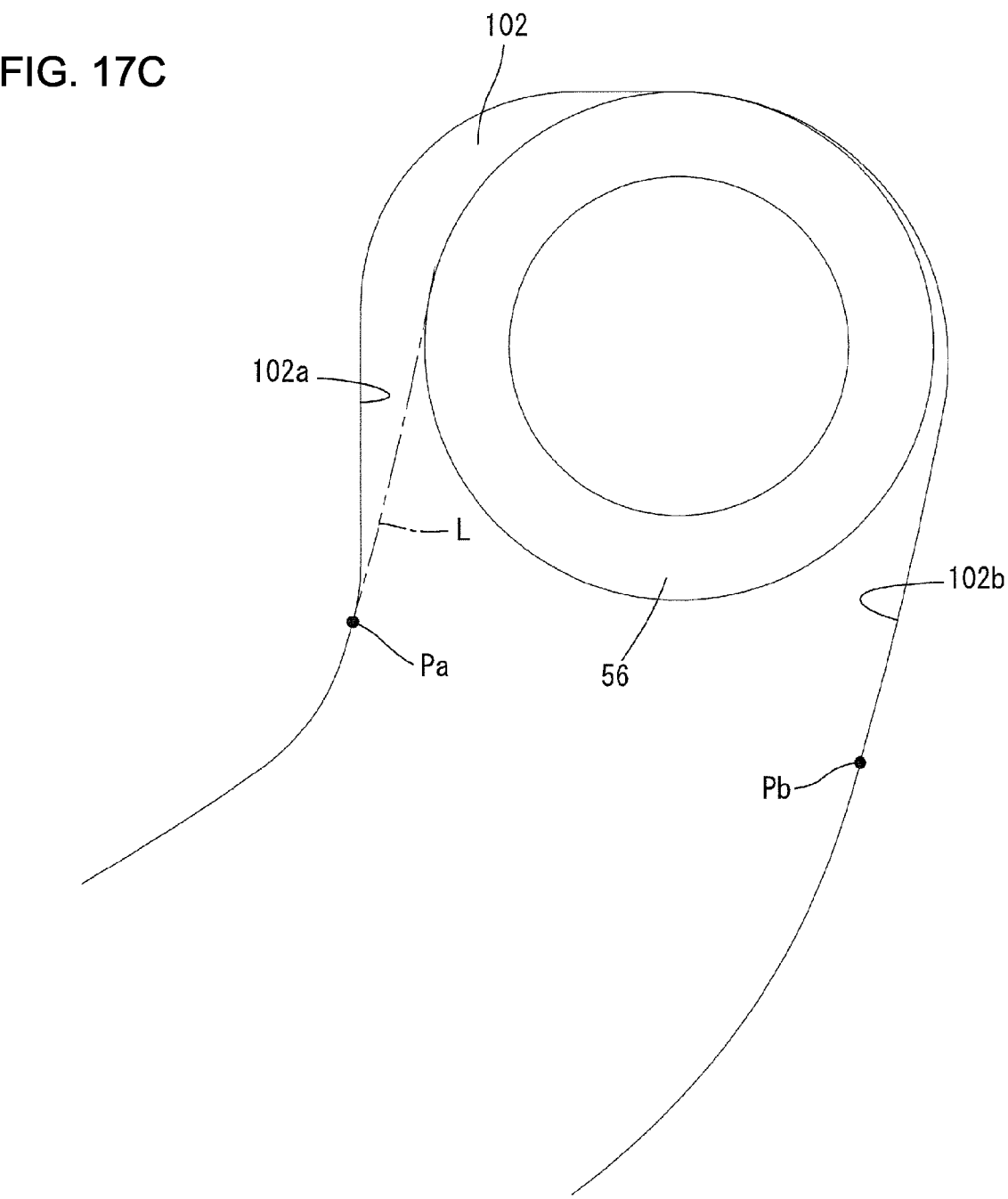
FIG. 17C is a diagram corresponding to FIG. 17A when the second hinge body is in the rotation limit position (position corresponding to the opening angle of the lid of) −4° in the fourth embodiment.

In the state where the hinge device is not attached to the case, as shown in FIG. 17C, the second hinge body 20 can further rotate relative to the first hinge body 10 until the slide pin 56 further reaches the end of the sub-groove portion 15y. The angle position (rotation limit position) of the second hinge body 20 with respect to the first hinge body 10 at this time is −α° (for example, −4°) when converted into the opening angle of the lid 3.

In the fourth embodiment, the slide pin 56 shifts to the sub-groove portion 102 when the lid 3 opens at the opening angle of less than 2°, but the slide pin 56 may shift to the sub-groove portion 102 at a larger angle. The first guide groove 100 of the fourth embodiment may be applied to the hinge device of the first and second embodiments.

The present invention is not limited to the above implementation and various modifications can be adopted without departing from the gist thereof.

The first and second arms may be one each.

The main groove portion of the first guide groove and the second guide groove may extend linearly. The first shaft member may be on or off the extension line of the main groove portion of the first guide groove.

The energizing member for energizing the first arm may be in a form other than a leaf spring or a torsion spring.

In the above embodiment, the first hinge body is fixed to the case body and the second hinge body is fixed to the lid. On the contrary, the second hinge body may be fixed to the case body and the first hinge body may be fixed to the lid. Further, the hinge device of the present invention may be attached to a small device such as a folding door or a personal computer.

The shape of the sub-groove portion of the first guide groove is not limited to the arc shape centered on the first shaft member but includes any shape that allows the other end of the second arm to make an arc around the first shaft member.

The friction resistance generation mechanism can adopt any configuration that generates friction resistance between the first arm and the second arm. For example, instead of using the friction plate and the disc spring, the tip of the intermediate shaft member may be crimped to bring the first and second arms into strong contact with each other.

INDUSTRIAL APPLICABILITY

The present invention is applicable to a hinge device including first and second hinge bodies and first and second arms connecting these hinge bodies.

What is claimed is:
1. A hinge device comprising:
   first and second hinge bodies (10, 20),
   first and second arms (30, 40) arranged between the first and second hinge bodies,
   a first shaft member (51) that rotatably connects one end of the first arm to the first hinge body,
   a second shaft member (52) that rotatably connects one end of the second arm to the second hinge body and
   an intermediate shaft member (50) that rotatably connects intermediate portions of the first and second arms,
   wherein a first guide (15; 15';100) having a main guide portion (15x; 15x';101) extending in a direction approaching or separating from the first shaft member is formed on the first hinge body and the other end of the second arm is slidably and rotatably guided to the first guide,
   wherein a second guide (25) extending in a direction approaching or separating from the second shaft member is formed on the second hinge body and the other end of the first arm is slidably and rotatably guided to the second guide,
   wherein the hinge device further comprises a friction resistance generation mechanism (60, 61) that provides frictional resistance against a relative rotation of the first and second arms around the intermediate shaft member and eventually provides friction torque against a relative rotation of the second hinge body with respect to the first hinge body, wherein the first hinge body is provided with an energizing member (70, 80) that applies rotation torque toward a rotation limit position to the second hinge body by energizing the first arm, wherein the first guide (15; 15; 100) further has a sub-guide portion (15y; 15y'; 102) connected to one end of the main guide portion, and wherein in the process in which the second hinge body rotates relative to the first hinge body over a specific angle range from the rotation limit position, the other end of the second arm (20) moves along the sub-guide portion (15y; 15y'; 102) and the sub-guide portion is formed so as to allow the other end of the second arm to move along an arc centered on the first shaft member (51).

2. The hinge device as claimed in claim 1, wherein the first hinge body (10) has first guide grooves (15; 15'; 100) as the first guide, and each of the first guide grooves has a main groove portion (15x; 15x'; 101) as the main guide portion and a sub-groove portion (15y; 15y'; 102) as the sub-guide portion, wherein the second hinge body (20) has second guide grooves (25) as the second guide, and wherein a first protrusion having a circular cross section inserted into the second guide grooves is formed at the other end of the first arm (30), and a second protrusion having a circular cross section inserted into the first guide grooves is formed at the other end of the second arm.

3. The hinge device as claimed in claim 2, wherein the first hinge body (10) and the second hinge body (20) each have a base wall (11, 21) and a pair of side walls (12, 22) that are orthogonal to the base wall and parallel to each other, the first guide grooves (15; 15'; 100) having the same shape are formed respectively on the pair of side walls of the first hinge body, and the second guide grooves (25) having the same shape are formed respectively on the pair of side walls of the second hinge body, wherein each of both ends of a first slide pin (55) which passes through and is supported by the other end of the first arm (30) is provided as the first protrusion, and wherein each of both ends of a second slide pin (56) which passes through and is supported by the other end of the second arm (40) is provided as the second protrusion.

4. The hinge device as claimed in claim 2, wherein the sub-groove portion (102) of each of the first guide grooves (100) has an inner edge (102a) close to the first shaft member (51) and an outer edge (102b) away from the first shaft member (51), and wherein in the process of the second hinge body (20) moving toward the rotation limit position in the specific angle range, and the second protrusion moves along the sub-groove portion without making contact with either the inner edge or the outer edge of the sub-groove portion.

5. The hinge device as claimed in claim 4, wherein the inner edge (102a) of the sub-groove portion (102) is deviated so as to be closer to the first shaft member than a virtual line (L) that draws the arc centered on the first shaft member (51) from a point (Pa) inside an intersection (103) of the main groove portion (101) and the sub-groove portion (102).

6. The hinge device as claimed in claim 1, wherein the energizing member consists of a torsion spring (80), and the torsion spring (80) has a locking portion (80b) that is locked to the first hinge body (10) and a pressing portion (80c), and wherein a receiving surface (31c) is formed at the one end of the first arm (30), and when the second hinge body (20) is in a predetermined torque applying angle range, the pressing portion of the torsion spring pushes the receiving surface.

7. The hinge device as claimed in claim 6, wherein the first hinge body (10) and the second hinge body (20) each have a base wall (11, 21) and a pair of side walls (12, 22) that are orthogonal to the base wall and parallel to each other, first guide grooves (15; 15';100) having the same shape as the first guide are formed respectively on the pair of side walls of the first hinge body, second guide grooves (25) having the same shape as the second guide are formed respectively on the pair of side walls of the second hinge body, a second protrusion protruding from the other end of the second arm (40) is inserted into the first guide grooves, and a first protrusion protruding from the other end of the first arm (30) is inserted into the second guide grooves, and wherein an elongated hole (19) is formed in the pair of side walls of the first hinge body, both ends of a pressing pin (82) are slidably inserted in the elongated hole along the elongated hole, and when the second hinge body is in the torque applying angle range, the pressing portion of the torsion spring pushes the receiving surface (31c) of the first arm via the pressing pin.

8. The hinge device as claimed in claim 1, wherein the energizing member consists of a leaf spring (70), both ends of the leaf spring are supported by the first hinge body (10), and a middle portion of the leaf spring is provided as a pressing portion (70a) protruding toward one end of the first arm, and wherein a receiving surface (31y) is formed at the one end of the first arm, and when the second hinge body (20) is in a predetermined torque applying angle range, the pressing portion of the leaf spring pushes the receiving surface.

9. The hinge device as claimed in claim 8, wherein the first hinge body (10) and the second hinge body (20) each have a base wall (11, 21) and a pair of side walls (12, 22) that are orthogonal to the base wall and parallel to each other, first guide grooves (15; 15'; 100) having the same shape as the first guide are formed respectively on the pair of side walls of the first hinge body, second guide grooves (25) having the same shape as the second guide are formed respectively on the pair of side walls of the second hinge body, a second protrusion protruding from the other end of the second arm is inserted into the first guide grooves, and a first protrusion protruding from the other end of the first arm is inserted into the second guide grooves, and wherein the leaf spring has both ends curved in an arc shape and the both ends of the leaf spring are hung on two support pins supported by the pair of side walls of the first hinge body.

10. The hinge device as claimed in claim 1, wherein the first guide (15') further has another sub-guide portion (15y'') that is connected to the other end of the main guide portion (15x') and extends in the direction opposite to the sub-guide portion (15y'), and in the process in which the second hinge body (20) rotates relative to another rotation limit position on the opposite side of the rotation limit position over another specific angle range, the other end of the second arm (40) moves along the another sub-guide portion (15y''), and the another sub-guide portion is formed so as to allow the other end of the second arm to move along an arc centered on the first shaft member (51), and wherein when the second hinge body is located within a predetermined torque applying angle range from the another rotation limit positions with respect to the first hinge body, the energizing member (70) applies the rotation torque toward the another rotation limit position to the second hinge body by energizing the first arm (30).

* * * * *